(12) United States Patent
McAdam et al.

(10) Patent No.: US 11,934,172 B2
(45) Date of Patent: Mar. 19, 2024

(54) OPERATOR CONSOLE WITH DYNAMIC FUTURE REPRESENTATIONS FOR PROCESSING EQUIPMENT

(71) Applicant: Honeywell International Inc., Morris Plains, NJ (US)

(72) Inventors: Rohan James McAdam, Walang (AU); Graeme John Laycock, Hunters Hill (AU); Berty Jacques Alain Bhuruth, Bankstown (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 25 days.

(21) Appl. No.: 17/339,182

(22) Filed: Jun. 4, 2021

(65) Prior Publication Data

US 2021/0389748 A1     Dec. 16, 2021

Related U.S. Application Data

(60) Provisional application No. 63/039,134, filed on Jun. 15, 2020.

(51) Int. Cl.
*G05B 19/408* (2006.01)

(52) U.S. Cl.
CPC ............ *G05B 19/4083* (2013.01); *G05B 2219/32128* (2013.01)

(58) Field of Classification Search
CPC ...... G05B 19/4083; G05B 2219/32128; G05B 19/048; G05B 19/4185; G05B 2219/31088; Y02P 90/80
See application file for complete search history.

(56) References Cited

U.S. PATENT DOCUMENTS

| 5,553,304 | A | 9/1996 | Lipner et al. |
| 7,593,837 | B2 * | 9/2009 | Nakaya ................... G05B 17/02 |
| | | | 703/6 |

(Continued)

FOREIGN PATENT DOCUMENTS

| CN | 110073301 A | 7/2019 |
| EP | 3270243 A1 | 1/2018 |

(Continued)

OTHER PUBLICATIONS

Indian Examination Report dated Feb. 24, 2022 issued in connection with corresponding Indian Application No. 202114025541 (7 pages total).

(Continued)

*Primary Examiner* — Christopher E. Everett
(74) *Attorney, Agent, or Firm* — John Maldjian, Esq.; Stevens & Lee PC

(57) ABSTRACT

A method includes generating a future state reflecting predicted values for a future time for a plurality of processing equipment for an industrial process run by an industrial process control and automation system (IPCS) configured to control the industrial process including at least one process controller coupled to input output (I/O) modules coupled to field devices including sensors and actuators that are coupled to processing equipment including the plurality of processing equipment. The method includes displaying in a human machine interface (HMI) associated with an operator computing system that is coupled to the process controller a dynamic time-based representation for each of the plurality of the processing equipment including beginning from a time beginning in the past including historical values, a value at a current time, and the predicted value at the future time.

15 Claims, 7 Drawing Sheets

(56) References Cited

U.S. PATENT DOCUMENTS

| | | | |
|---|---|---|---|
| 8,781,987 | B1 | 7/2014 | Shuster et al. |
| 9,733,626 | B2 | 8/2017 | Friman et al. |
| 2006/0092033 | A1 | 5/2006 | Hoff et al. |
| 2007/0208549 | A1* | 9/2007 | Blevins .............. G05B 19/0428 703/6 |
| 2007/0232374 | A1* | 10/2007 | Lopiccolo .............. G10H 1/342 463/7 |
| 2010/0082125 | A1 | 4/2010 | Pingel et al. |
| 2012/0042003 | A1 | 2/2012 | Goetz et al. |
| 2012/0165087 | A1* | 6/2012 | Epstein .................. G09B 15/00 463/7 |
| 2014/0004487 | A1 | 1/2014 | Cheben et al. |
| 2014/0135947 | A1* | 5/2014 | Friman .............. G05B 23/0264 700/29 |
| 2014/0282015 | A1 | 9/2014 | Nixon et al. |
| 2017/0255192 | A1 | 9/2017 | Thwaites et al. |
| 2018/0104589 | A1* | 4/2018 | Kiyomoto ............. A63F 13/814 |
| 2019/0384267 | A1 | 12/2019 | Krishnamurthy et al. |
| 2020/0081736 | A1 | 3/2020 | Gopalan et al. |
| 2020/0103885 | A1 | 4/2020 | Pani et al. |
| 2021/0096542 | A1 | 4/2021 | Stump et al. |
| 2022/0044178 | A1 | 2/2022 | Hollender et al. |
| 2022/0066425 | A1 | 3/2022 | Bhat |

FOREIGN PATENT DOCUMENTS

| | | |
|---|---|---|
| EP | 3599527 A1 | 1/2020 |
| WO | 2006/102104 A1 | 9/2006 |
| WO | 2018/102228 A1 | 6/2018 |

OTHER PUBLICATIONS

Extended European Search Report dated Nov. 30, 2021 issued in connection with corresponding EP Application No. 21178893.0 (8 pages total).

Canadian Office Action dated Jul. 14, 2022, issued in connection with corresponding Canadian Patent Application No. 3119369 (4 pages total).

Australian Examination Report dated Mar. 29, 2022, issued in connection with corresponding Australian Patent Application No. 2021203277 (3 pages total).

Australian Examination Report dated Nov. 23, 2022, issued in connection with corresponding Australian Patent Application No. 2021203277 (3 pages total).

First Examination Report in India dated Mar. 9, 2022, issued in connection with corresponding Indian Patent Application No. 202114022865 (6 pages total).

Extended European Search Report dated Oct. 8, 2021, issued in connection with corresponding European Patent Application No. 21175465.0 (10 pages total).

Australian Examination Report dated Mar. 9, 2022, issued in connection with corresponding Australian Patent Application No. 2021203799 (3 pages total).

Australian Examination Report dated Feb. 10, 2023, issued in connection with corresponding Australian Patent Application No. 2021203277 (3 pages total).

European Examination Report dated Mar. 17, 2023, issued in connection with corresponding European Patent Application No. 21178893.0 (7 pages total).

Extended European Search Report dated Oct. 13, 2023, issued in connection with corresponding European Patent Application No. 23171000.5 (11 pages total).

* cited by examiner

OPERATOR CONSOLE WITH DYNAMIC FUTURE REPRESENTATIONS FOR PROCESSING EQUIPMENT

CROSS REFERENCE TO RELATED APPLICATIONS

This application claims the benefit of Provisional Application Ser. No. 63/039,134, entitled "OPERATOR CONSOLE WITH DYNAMIC FUTURE REPRESENTATIONS FOR PROCESSING EQUIPMENT", filed Jun. 15, 2020, which is herein incorporated by reference in its entirety.

FIELD

This Disclosure relates to industrial process control and automation system (IPCS's), more particularly to displays for operators of the IPCS.

BACKGROUND

IPCS are commonly used to automate large and complex industrial processes. These systems routinely include process controllers and field devices including sensors and actuators. The process controllers typically receive measurements from the sensors and generate control signals that are sent to the actuators.

IPCS are commonly used in various industries to run production processes, and can for example be configured with control schemes using programmable logic controllers (PLC(s)), or in the case of more complex systems using a distributed control system (DCS) or a supervisory control and data acquisition (SCADA) system. Automated process control relies on one or more process controllers that are communicatively coupled by input/output (I/O) modules coupled to one or more field devices that are coupled to processing equipment, where the field devices comprise sensors for sensing parameters such as temperature and pressure, and actuators configured for receiving control signals generated by the process controllers and adjusting settings of the processing equipment.

The operators of the IPCS referred to herein as industrial console operators have an operator console including an operator computer system and a human machine interface (HMI) configured to monitor the process and to implement various actions to achieve a desired process state or process outcome. The HMI provides the industrial console operator of the industrial process with an interface that allows them to monitor and to control a process in real-time. A key aspect of an industrial console operator's task involves acquiring and maintaining sufficient situation awareness (SA) with respect to the state of the process so that they understand the significance of what is currently happening and what they should be doing (if anything) to maintain safe and efficient production for the process. A particularly important element of SA is the ability of the operator themselves to project, into the future the current state of the process, such as current flows, temperatures, pressures, densities, product qualities, and associated operational activities, such as for achieving and maintaining target production rates and qualities, minimizing energy consumption to allow them to anticipate what is likely to happen to the process in future, and to deal proactively with any operational issues to the process that may occur.

Conventional HMIs provide several mechanisms to allow an operator to understand the current situation with the process. For example, a level 1 overview generally provides a clear indication of the current state of key process parameters, including whether the process parameters fall within their respective operational limits, and the HMI also display alarms when any of the process parameters being displayed are outside their operational limits. Time series trends provide the history of the values of the process parameters up until the current time. However, these known display mechanisms typically require the operator to rely on their own understanding of process dynamics and planned operational activities to establish a SA.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem of industrial console operators varying significantly in their respective abilities to project the state of the production process into the future and thus their SA, so that the reliability of process operations is subject to each individual industrial console operator's respective ability. Even the most experienced industrial console operator may find it difficult to anticipate the future state of the process when it is subject to complex influences. For example, complex influences can include advanced control strategies, operational activities such as changes in raw materials, changes in the products to be made, changes in target production rates and qualities, maintenance activities such as equipment servicing and replacement, and the weather (e.g., the temperature, humidity, precipitation, wind, air pressure), which can all affect a production process to a greater or lesser degree depending on the particular type of process.

Disclosed aspects solve this problem by an operator console that assists an operator to more effectively project the state of the process into the future to make the notion of the future of the process an explicit and central feature of how a disclosed HMI is organized. Key organizing elements of disclosed HMI's include explicit representation of the past, the current and the future state of the of the processing equipment so that the task of apprehending the future state of the process is no more difficult than apprehending the current state of the process in current HMIs.

Disclosed aspects include a method comprising generating a future state reflecting predicted values for future time a plurality of processing equipment for an industrial process run by an IPCS configured to control the industrial process including at least one process controller coupled to I/O modules coupled to field devices including sensors and actuators that are coupled to processing equipment. The method includes displaying in an HMI dynamic (meaning real-time updating) associated with an operator computing system that is coupled to the process controller a dynamic time-based representation (sometimes referred to herein as a "roadway" with each processing equipment/processing unit represented by a "lane") for each of the plurality of processing equipment including from a time beginning in the past comprising historical values, a value at a current time, and the predicted values at the future time.

Data for the generating of the future state can be obtained from at least one of operations planning systems, maintenance systems, and weather services, and the future state can include at least one projected future event. The projected future event can comprise at least one of production activities, maintenance activities, weather, and predicted critical alarms associated with the plurality of processing equipment.

The phrase "generating a future state reflecting predicted values for a future time for a plurality of processing equipment for an industrial process run by an IPCS" means the future state reflects (or includes) predicted values, so that the relationship between the future state and the predicted values is established. The future state includes at least one projected future event. Because the future state includes at least one projected future event, disclosed aspects can include the case when the future state include a plurality of values including values obtained from a plurality of different data sources, such as from operations planning systems, maintenance systems, and weather services, and future state includes at least one projected future event, such as the weather, and predicted critical alarms associated with the plurality of processing equipment.

DETAILED DESCRIPTION

Figure 1:
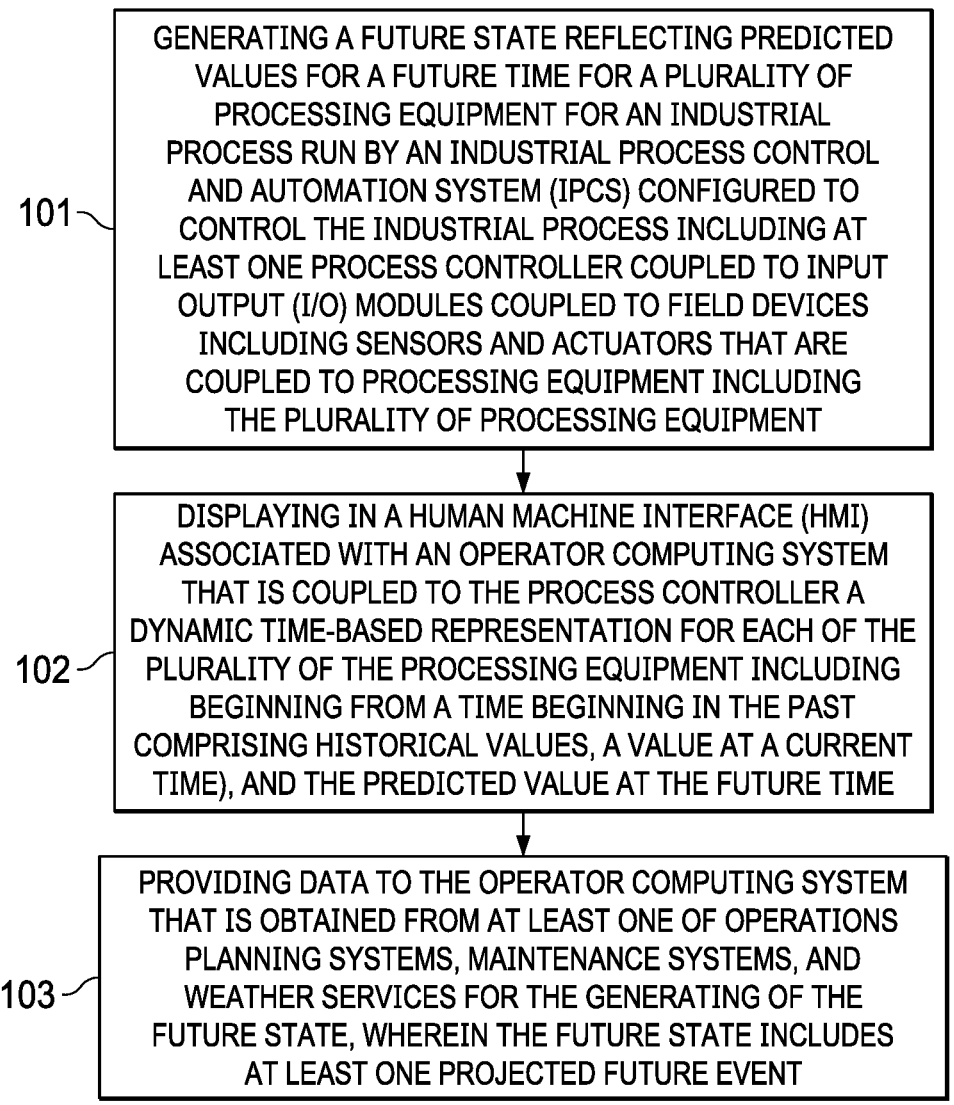
FIG. 1 is a flowchart that shows steps for an example method of dynamic future representation of a future process state and operation events for an operator in an IPCS, according to a disclosed aspect.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an IPCS air's an industrial process involving a tangible material that disclosed embodiments apply. For example, oil and gas, chemical, beverage, pharmaceutical, pulp and paper manufacturing, petroleum processes, electrical power including renewable energy, and water. An IPCS is distinct from a data processing system that only performs data manipulations.

FIG. 1 is a flowchart that shows steps for an example method 100 of dynamic future representation of future process state and operations events for an operator in an IPCS, according to a disclosed aspect. Step 101 comprises generating a future state reflecting predicted values for a future time for a plurality of processing equipment for an industrial process run by an IPCS configured to control the industrial process including at least one process controller coupled to I/O modules coupled to field devices including sensors and actuators that are coupled to processing equipment including the plurality of processing equipment. Step 102 comprises displaying in a HMI associated with an operator computing system that is coupled to the process controller a dynamic time-based representation ("roadway") for each of the plurality of the processing equipment (generally each shown in a "lane") including beginning from a time beginning in the (recent) past comprising historical values (generally shown nearest the operator), a value at a current time (NOW), and the predicted value at the future time (generally shown furthest from the operator).

Optional step 103 comprises providing data to the operator computing system that is obtained from at least one of operations planning systems, maintenance systems, and weather services for the generating of the future state, wherein the future state includes at least one projected future event. The projected future events can comprise at least one of production activities, maintenance activities, weather, and predicted critical alarms from the process parameter associated with the processing equipment. If everything is determined to be running smoothly in the process, there may be nothing on the roadway for the time period into the future shown.

Figure 2:
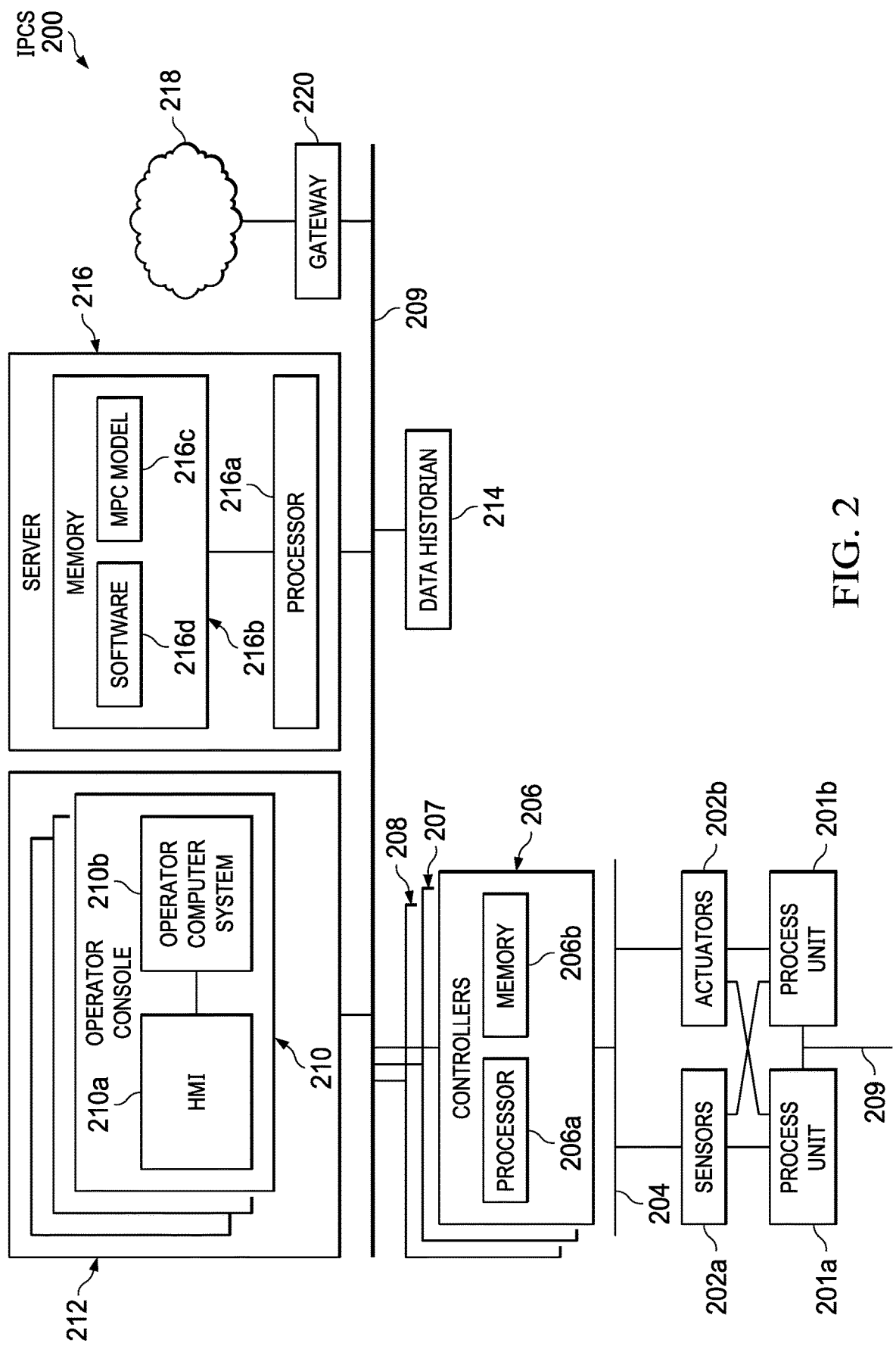
FIG. 2 illustrates an example IPCS that can benefit from disclosed aspects, according to a disclosed embodiment.

FIG. 2 illustrates an IPCS 200 that can benefit from disclosed aspects. As shown in FIG. 2, the IPCS 200 includes various components that facilitate production or processing of at least one product or other tangible material. For instance, the IPCS 200 can be used to facilitate control over components in one or multiple industrial plants. Each plant represents one or more processing facilities (or one or more portions thereof), such as one or more manufacturing facilities for producing at least one product or other tangible material. In general, each plant may implement one or more industrial processes, and can individually or collectively be referred to as being a processing system. A processing system generally represents any system or portion thereof configured to process one or more products or other tangible materials in some manner.

The IPCS 200 includes field devices comprising one or more sensors 202a and one or more actuators 202b that are coupled between the controllers 206, 207 and 208 and the processing equipment, shown in simplified form as process unit 201a coupled by piping 209 to process unit 201b. Each of the controllers include a processor and a memory, shown as processor 206a and memory 206b for controller 206. The sensors 202a and actuators 202b represent components in a process system that may perform any of a wide variety of functions. For example, the sensors 202a can measure a wide variety of characteristics in the processing system, such as flow, pressure, or temperature. Also, the actuators 202b can alter a wide variety of characteristics in the processing system, such as valve openings. Each of the sensors 202a includes any suitable structure for measuring one or more characteristics in a process system. Each of the actuators 202b includes any suitable structure for operating on or affecting one or more conditions in an IPCS.

At least one network 204 is shown providing a coupling between the controllers 206 and the sensors 202a and actuators 202b. The network 204 facilitates controller interaction with the sensors 202a and actuators 202b. For example, the network 204 can transport measurement data from the sensors 202a to the controllers 206-208 and provide control signals from the controllers 206-208 to the actuators 202b. The network 204 can represent any suitable network or combination of networks. As particular examples, the network 204 can represent at least one Ethernet network (such as one supporting a FOUNDATION FIELDBUS protocol), electrical signal network (such as a (Highway Addressable Remote Transducer (HART) network which is a hybrid analog plus digital industrial automation open protocol), pneumatic control signal network, or any other or additional type(s) of network(s).

The process controllers 206-208 are generally configured in multiple Purdue model levels that may be present at all levels besides level 0, where level 0 generally only includes the field devices (sensors and actuators) and the processing equipment. The process controllers 206-208 can be used in the IPCS 200 to perform various functions in order to control one or more industrial processes.

For example, a first set of process controllers 206-208 corresponding to level 1 in the Purdue model may refer to smart transmitters or smart flow controllers, where the control logic is embedded in memory associated with these controllers. Level 2 generally refers to a distributed control system (DCS) controller, such as the C300 controller from Honeywell International. These level 2 controllers can also include more advanced strategies including machine level control built into the C300 controller, or another similar controller. Level 3 is generally reserved for controllers implemented by the server 216. These controllers interact with the other level (1, 2 and 4) controllers.

The level 1 controllers in the case of smart devices, or level 2 controllers such as the C300 controller, may use measurements from one or more sensors 202a to control the operation of one or more actuators 202b. The level 2 process controllers 206 can be used to tune the control logic or other operations performed by the level 1 process controllers. For example, machine-level controllers, such as DCS controllers, at Purdue level 2 can log information collected or generated by process controllers 206 that are on level 1, such as measurement data from the sensors 202a or control signals for the actuators 202b.

A third set of controllers implemented by the server 216 corresponding to level 3 in the Purdue model, known as unit-level controllers which generally perform MPC control, can be used to perform additional functions. The process controllers 206 and controllers implemented by the server 216 can collectively therefore support a combination of approaches, such as regulatory control, advanced regulatory control, supervisory control, and advanced process control. In one arrangement, the third set of controllers implemented by the server 216 comprises an upper-tier controller corresponding to level 4 in the Purdue model, which generally also performs MPC control, also known as a plant-level controller, coupled to a lower-tier controller corresponding to level 3 in the Purdue model.

The server 216 is shown including a model process control (MPC) simulation model generally resides in a memory (shown as MPC model 216c stored in memory 216b as shown in FIG. 2) associated with the upper-tier controller implemented by the server 216. The upper-tier controller uses the MPC simulation model 216c to predict movements in the process, participates in controlling the plant, and interacting with the MPC simulation model 216c to optimize overall economics of the plant including sending an output from the MPC simulation model 216c as setpoint targets to the lower-tier controller. The lower-tier controller uses the setpoint targets for diverting the raw material or the intermediate material in the piping network.

At least one of the process controllers 206-208 shown in FIG. 2 could denote a MPC controller that operates using one or more process models. For example, each of these process controllers 206-208 can operate using one or more process models, including an MPC simulation model, to determine, based on measurements from one or more sensors 202a, how to adjust one or more actuators 202b. In some embodiments, each model associates one or more measured variables (MVs) or disturbance variables (DVs) (often referred to as independent variables) with one or more control variables (CVs) (often referred to as dependent variables). Each of these process controllers 206-208 can use an objective function to identify how to adjust its MVs in order to push its CVs to the most attractive set of constraints.

At least one network 209 couples the process controllers 206 and other devices in the IPCS 200. The network 209 facilitates the transport of information between to components. The network 209 can represent any suitable network or combination of networks. As particular examples, the network 209 can represent at least one Ethernet network.

Industrial console operator access to and interaction with the process controllers 206-208 and other components of the system 200 including the server 216 can occur via various disclosed operator consoles 210 which comprise an HMI 210a coupled to an operator computer system 210b. Each operator console 210 can be used to provide information to an industrial console operator and receive information from the operator. For example, each operator console 210 can provide information identifying a current state of an industrial process to the industrial consul operator, such as values of various process variables and warnings, alarms, or other states associated with the industrial process.

Each operator console 210 can also receive information affecting how the industrial process is controlled, such as by receiving setpoints or control modes for process variables controlled by the process controllers 206-208 or a process controller implemented by the server 216, or other information that alters or affects how the process controllers control the industrial process. Each operator console 210 includes any suitable structure for displaying information to and interacting with an operator. For example, the operator computing device can run a WINDOWS operating system or other operating system.

Multiple operator consoles 210 can be grouped together and used in one or more control rooms 212. Each control room 212 could include any number of operator consoles 210 in any suitable arrangement. In some embodiments, multiple control rooms 212 can be used to control an industrial plant, such as when each control room 212 contains operator consoles 210 used to manage a discrete part of the industrial plant.

The IPCS 200 generally includes at least one data historian 214 that generally includes event logs that are entered by operators or technicians, and generally includes at least one server 216. The server 216 is generally in level 3 or 4 in the Purdue model. The processor 216a can comprise a digital signal processor (DSP), a microcontroller, an application specific integrated circuit (ASIC), a general processor, or any other combination of one or more integrated processing devices.

The data historian 214 represents a component that stores various information about the IPCS 200. The data historian 214 can, for instance, store information that is generated by the various process controllers 206-208 during the control of one or more industrial processes, as well as event logs. The data historian 214 includes any suitable structure for storing and facilitating retrieval of the information it stores. Although shown as a single component here, the data historian 214 can be located elsewhere in the IPCS 200, such as in the cloud, or multiple data historians can be distributed in different locations in the IPCS 200.

The server's 216 processor 216a executes applications for users (operators) of the operator consoles 210 or other applications. The applications can be used to support various functions for the operator consoles 210, the process controllers 206, or other components of the system 200. Each server 216 can represent a computing device running a WINDOWS operating system or other operating system. Note that while shown as being local within the IPCS 200, the functionality of the server 216 can be remote from the system 200. For instance, the functionality of the server 216 can be implemented in a computing cloud 218, or in a remote server communicatively coupled to the system 200 via a gateway 220.

Although FIG. 2 illustrates one example of an IPCS 200, various changes may be made to the IPCS 200. For example, the IPCSC 200 can include any number of sensors, actuators, controllers, networks, operator consoles, control rooms, data historians, servers, and other components.

The presentation of future events can have information and guidance associated with them for the operator that further enhances an operator's ability to anticipate and deal with the future course of events to raise their SA. For example, a planned raw material feed switch may have a potentially detrimental effect on the operation of the process when the switch occurs unless the operator takes an appropriate action such as adjusting process flows, temperatures, pressures, to account for differing raw material qualities. A visualization based on an explicit representation of the predicted value at the future time for the production process provided by disclosed aspects makes it easy to see what the planned activity is, what its effect is likely to be, and what the operator may need to do to avoid unnecessary disturbance to the process.

A disclosed operator console can be constructed by integrating information from a variety of data sources into future-based visualizations for the operator. For example, data from operations planning systems, maintenance systems, and weather services can provide information on planned or expected future events. Predictions of the future evolution of individual process parameters can be provided by model-based predictions, such as those available from MPC algorithms.

EXAMPLES

Disclosed embodiments of the invention are further illustrated by the following specific Examples, which should not be construed as limiting the scope or content of this Disclosure in any way.

Figure 3:
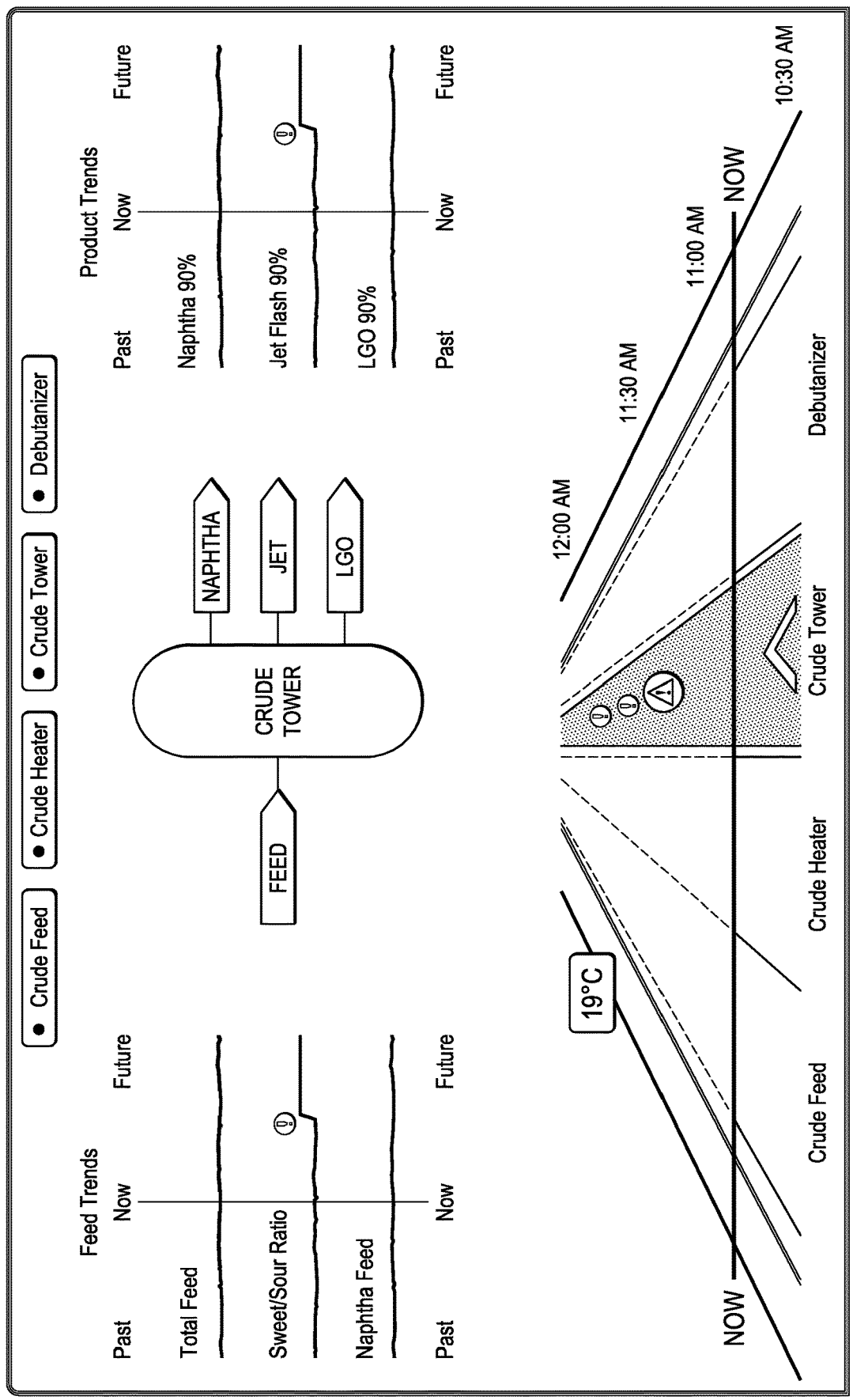
FIG. 3 shows an example scanned screenshot for a disclosed HMI of an operator console that provides dynamic future representations of the future process state and operations events for an operator in an IPCS.

FIG. 3 shows an example screenshot for a disclosed HMI of an operator console that provides a dynamic future representation of the future process state and operations events for an operator in an IPCS, shown by example for an atmospheric crude distillation tower. Two primary, time-based visualizations are shown as "roadways" at the bottom of FIG. 3 and the trends down the left and right hand sides of FIG. 3 provide the operator with information about the future state of the distillation process. A portion of a process flowsheet for the portion of the process the operator is currently focusing on (a crude tower in this particular example is also shown in FIG. 3). Other process units (or processing equipment) that the operator can look at are also listed across the top of FIG. 3 and are represented by lanes in the "roadway". The "roadway" shown at the bottom center of the display provides a dynamic representation of future events for processing equipment involved in the production distillation process.

A disclosed "roadway" typically provides a dynamic representation of aggregates of process parameters, such as for major pieces of processing equipment or entire process units. The trends on the left and right provide a view of individual process parameters. The "roadway" shows upcoming events related to the items represented by each lane (a process unit, or a major piece of processing equipment), such as production activities, maintenance activities, weather, and predicted critical alarms from process parameters associated with the equipment/process unit. The detailed view of individual process parameters is shown in the trends rather than the "roadway". In the primary mode of operation of an HMI associated with a disclosed operator computing system, the operator "travels" down the "roadway" in real-time.

Objects automatically come into view on the HMI as time passes. Optionally an operator might use a mouse, their voice, or some other interaction mechanism to advance themselves into the future to be able see what is occurring up ahead in time (future time). "Travel" along the roadway with future events as a result brings into view in the distance, reaching the present, and ultimately disappearing from a view "behind" the operator with the passage of time. The "roadway" is only one possible disclosed representation of the future events. Another possible future events representation is a "flight path" representation which allows a three-dimensional (3D) arrangement of information rather than the two-dimensional representation provided by a disclosed "roadway" shown in FIG. 3.

Other HMI elements shown that complement this visualization include time series trends that scroll right to left as time passes with the time=NOW shown at the center of the trend for the feed and for the product. Data points to the left of NOW represent the history of a process parameter up until the present time. Data points to the right of NOW represent the predicted values for the time series into the future. Events that appear on the "roadway" at the bottom of the HMI also appear on the trends that create a strong visual correlation for an operator between the information shown in the different parts of the HMI.

FIGS. 4-7 are FIGs showing visualizations. which further illustrate some example capabilities of disclosed "roadways". As with FIG. 3, the visualizations shown in FIGS. 4-7 extend from a period in the recent past (shown nearest for the operator, to the current time (NOW), and into the future further along the roadway (shown furthest away for the operator).

The right hand edge indicates the time at points along the roadway. The left hand edge indicates the weather over time expressed in ° C. There is one lane on the roadway for each major piece of processing equipment (or production process unit). The lane for the process unit currently shown in the HMI (Crude Tower in this case) can be optionally highlighted such as being bolded. The process flow sheet for the process unit currently shown in the HMI in the center of the HMI. Time series trends for key process parameters for the process unit currently shown in the HMI, including predicted future parameter values, are shown to the left and to the right of the process flowsheet as feed trends and product trends, respectively.

Figure 7:
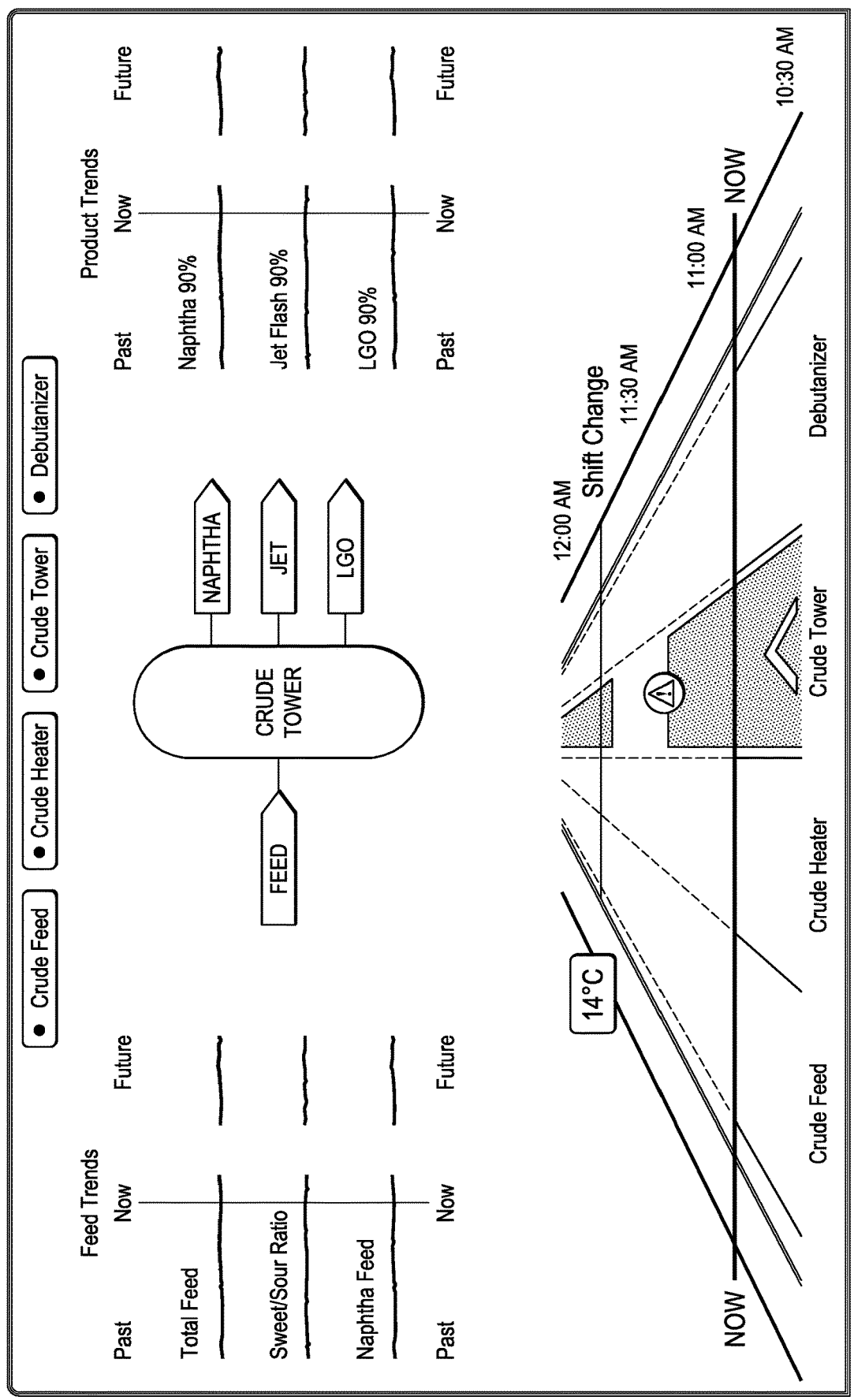

Each lane shows upcoming events for the respective processing equipment/process unit represented by the unit including production activities, Maintenance activities, predicted critical alarms, and periods of equipment/process unit outage (see FIG. 7 described below). Events that apply to all of the processing equipment/process units represented on the roadway are represented by lines across the entire roadway, where the NOW shown refers the current time, and operator shift changes are shown.

Events on the roadway also appear on the process parameter trends to which they apply to the left and right of the HMI to create a visual correlation. Events on the roadway dynamically "travel" toward the viewer as time passes. As future events approach the current time (NOW) associated information appears adjacent to the event icon (see FIG. 5). Associated information for an event in the future can also be revealed by a gesture such as hovering a mouse cursor or other pointing device over the event icon (see FIG. 6).

The passage of time represented by the movement of icons on the roadway need not be constant. Icons in the distance may move slower and speed up as they approach the current time to help provide the operator/viewer a sense of motion when the natural time scale of events is relatively slow.

Figure 4:
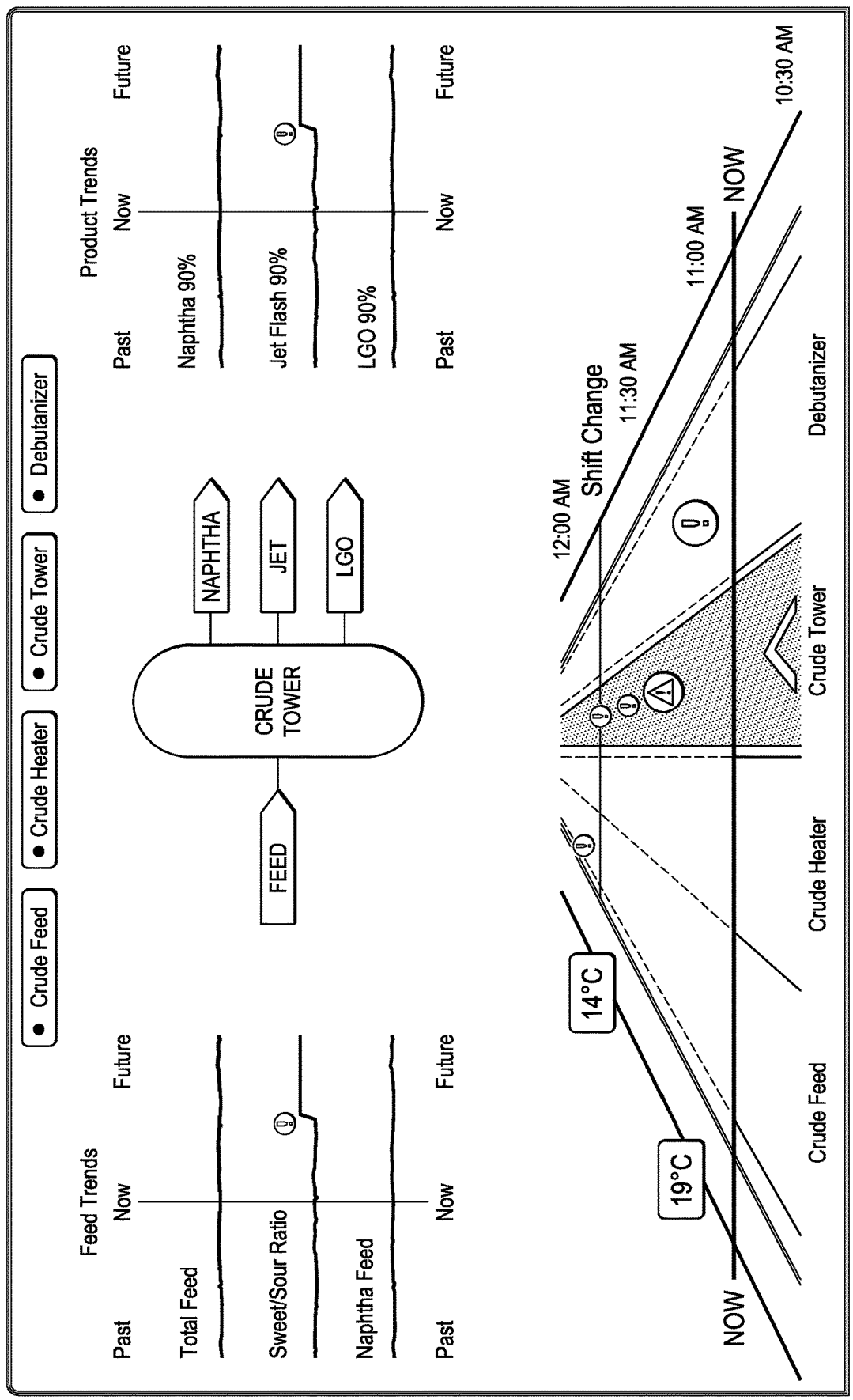
FIGS. 4-7 show additional example scanned screenshots for a disclosed HMI of an operator console that provides dynamic future representations of the future process state and operations events for an operator in an IPCS.
Figure 5:
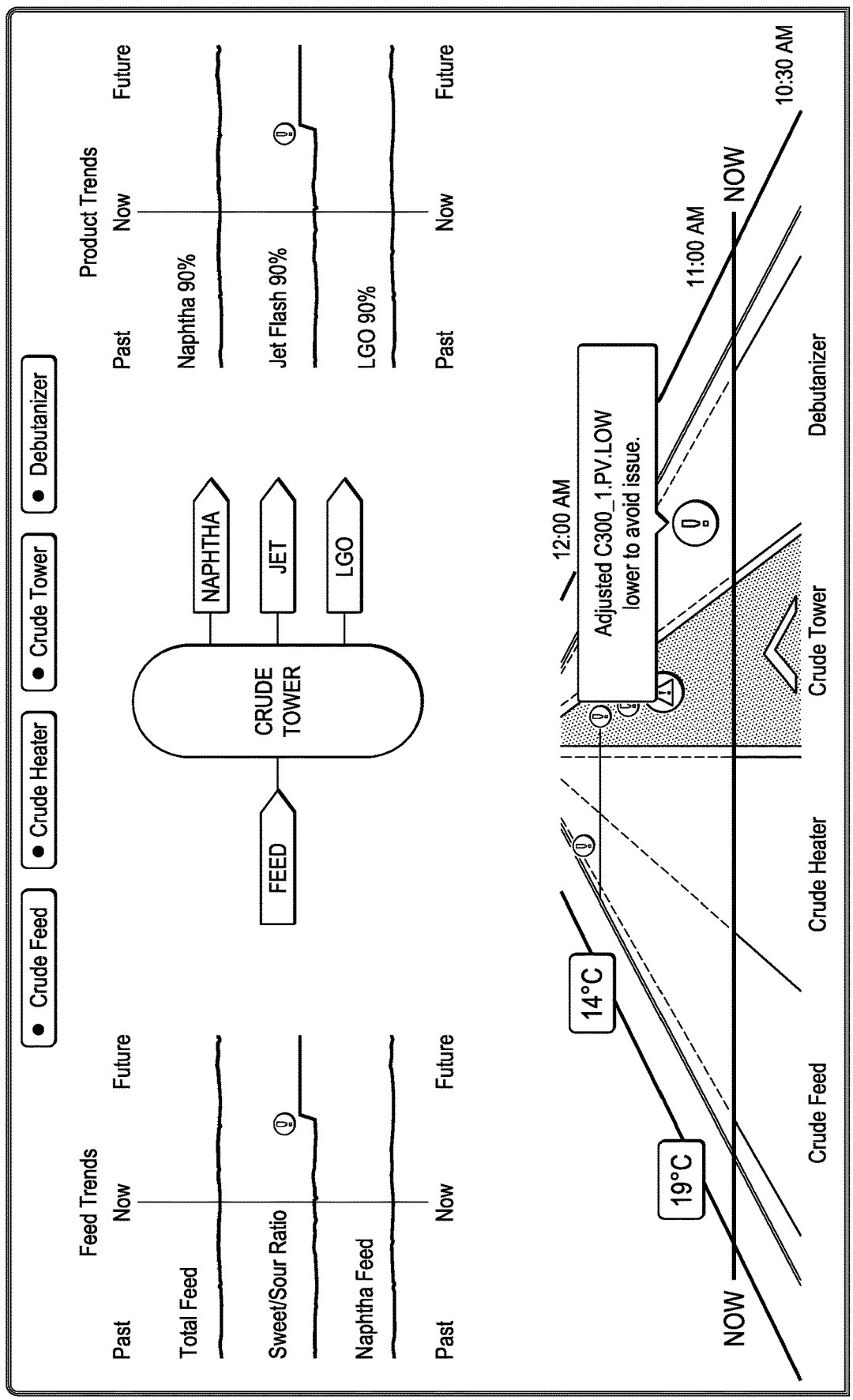
Figure 6:
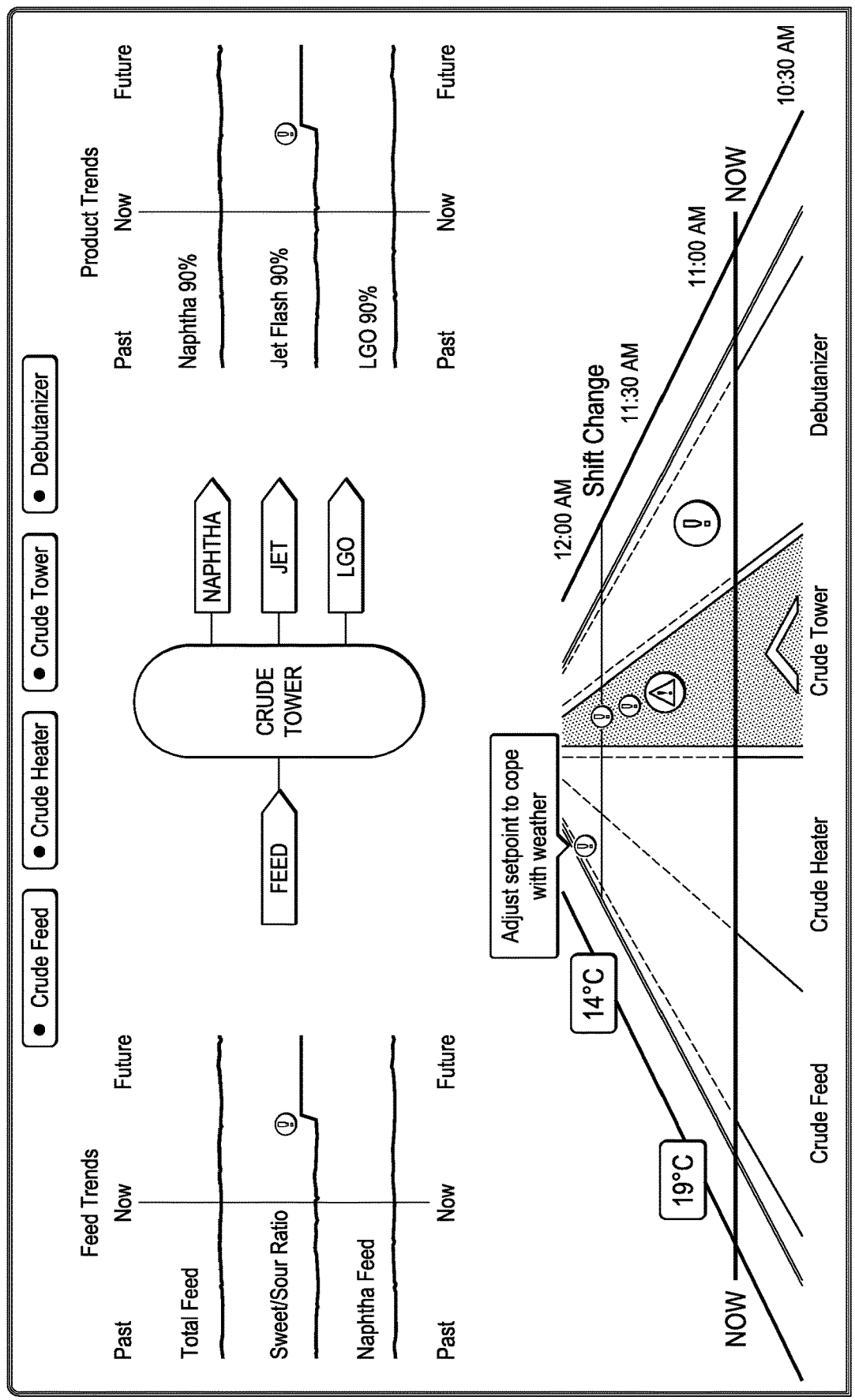

The operator/viewer may also change the time scale of the roadway. Although FIG. 4 shows the roadway with a future time span of 1 hour (11:00 am reflecting the time NOW to 12:00 pm), the operator/viewer can generally change this future time span to see more or less than 1 hour into the future. Controls for accomplishing this change are not shown, but could be as simple as clicking on the time scale on the right of the roadway to reveal a list of time scales, from which the operator/viewer could select. The operator/viewer may also scroll the roadway further into the future or back into the past, such as by clicking and dragging forward or backwards on the roadway with a mouse or other pointing device.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method comprising:
generating a future state reflecting predicted values for a future time for a plurality of processing equipment for an industrial process run by an industrial process control and automation system (IPCS) configured to control the industrial process including at least one process controller coupled to input output (I/O) modules coupled to field devices including sensors and actuators that are coupled to processing equipment including the plurality of processing equipment;
displaying in a human machine interface (HMI) associated with an operator computing system that is coupled to the process controller a dynamic time-based representation, for each of the plurality of the processing equipment including from a time beginning in the past comprising historical values, a value at a current time (NOW), and the predicted value at the future time, wherein the dynamic time-based representation comprises a roadway including a plurality of lanes represents flight path which allows a three-dimensional (3D) arrangement of information traveling along the roadway, wherein each lane of the plurality of lanes corresponds to each of the plurality of processing equipment, wherein the dynamic time-based representation includes the time beginning in the historical values shown nearest to an operator before the current time (NOW), and the predicted value at the future time shown furthest from the operator after the current time (NOW), wherein the plurality of lanes along the roadway shows upcoming events for the respective plurality of processing equipment, each event of the upcoming events dynamically travel toward the operator as time passes, and appears on process parameter trends to create a visual correlation on left and right of the HMI.

2. The method of claim 1, wherein data for the generating of the future state is obtained from at least one of operations planning systems, maintenance systems, and weather services, and wherein the future state includes at least one projected future event.

3. The method of claim 2, wherein the projected future event comprises at least one of production activities, maintenance activities, weather, and predicted critical alarms associated with a process parameter associated with the plurality of processing equipment.

4. The method of claim 2, wherein the projected future event also appear on trends to create a visual correlation between information shown in different areas of the HMI.

5. The method of claim 1, wherein a time period from the current time to the future time is adjustable to enable showing a longer or shorter time period measured from the current time to the future time.

6. A non-transitory computer readable medium containing instructions that when executed cause at least one operator console comprising an operator computing system including at least one processor device coupled to a human machine interface (HMI) causes the operator computer system to implement a method comprising:
generating a future state reflecting predicted values for a future time for a plurality of processing equipment for an industrial process run by an industrial process control and automation system (IPCS) configured to control the industrial process including at least one process controller coupled to input output (I/O) modules coupled to field devices including sensors and actuators that are coupled to the plurality of processing equipment;
displaying in the human machine interface (HMI) associated with the operator computing system that is coupled to the process controller a dynamic time-based representation for each of the plurality of the processing equipment including from a time beginning in the past comprising historical values a value at a current time (NOW), and the predicted value at the future time, wherein the dynamic time-based representation comprises a roadway including a plurality of lanes represents flight path which allows a three-dimensional (3D) arrangement of information traveling along the roadway, wherein each lane of the plurality of lanes corresponds to each of the plurality of processing equipment, and wherein dynamic time-based representation includes the time beginning in the historical values shown nearest to an operator before the current time (NOW), and the predicted value at the future time shown furthest from the operator after the current time (NOW), wherein the plurality of lanes along the roadway shows upcoming events for the respective plurality of processing equipment, each event of the upcoming events dynamically travel toward the operator as time passes, and appears on process parameter trends to create a visual correlation on left and right of the HMI.

7. The computer readable medium of claim 6, wherein data for the generating of the future state is obtained from at least one of operations planning systems, maintenance systems, and weather services, and wherein the future state includes at least one projected future event.

8. The computer readable medium of claim 7, wherein the projected future event comprises at least one of production activities, maintenance activities, weather, and predicted critical alarms from a process parameter associated with the plurality of processing equipment.

9. The computer readable medium of claim 7, wherein the projected future event also appear on trends to create a visual correlation between information shown in different areas of the HMI.

10. The computer readable medium of claim 6, wherein a time period from the current time to the future time is adjustable, to enable showing a longer or shorter time period measured from the current time to the future time.

11. A system comprising:
at least one operator console comprising an operator computing system including at least one processor device coupled to a human machine interface (HMI), wherein the at least one processor device is configured to:
generate a future state reflecting predicted values for a future time for a plurality of processing equipment for an industrial process run by an industrial process control and automation system (IPCS) configured to control the industrial process including at least one process controller coupled to input output (I/O) modules coupled to field devices including sensors and actuators that are coupled to the plurality of processing equipment;
display, in the human machine interface (HMI) associated with the operator computing system that is coupled to the process controller, a dynamic time-based representation for each of the plurality of the processing equipment, including from a time beginning in the past comprising historical values a value at a current time (NOW), and the predicted value at the future time, wherein the dynamic time-based representation comprises a roadway including a plurality of lanes represents flight path which allows a three-dimensional (3D) arrangement of information traveling along the roadway, wherein each lane of the plurality of lanes corresponds to each of the plurality of processing equipment, and wherein dynamic time-based representation includes the time beginning in the historical values shown nearest to an operator before the current time (NOW), and the predicted value at the future time shown furthest from the operator after the current time (NOW), wherein the plurality of lanes along the roadway shows upcoming events for the respective plurality of processing equipment, each event of the upcoming events dynamically travel toward the operator as time passes, and appears on process parameter trends to create a visual correlation on left and right of the HMI.

12. The system of claim 11, wherein data for generating of the future state is obtained from at least one of operations planning systems, maintenance systems, and weather services, and wherein the future state includes at least one projected future event.

13. The system of claim 12, wherein the projected future event comprises at least one of production activities, maintenance activities, weather, and predicted critical alarms associated with a process parameter associated with the plurality of processing equipment.

14. The system of claim 12, wherein the projected future event also appears on trends to create a visual correlation between information shown in different areas of the HMI.

15. The system of claim 11, wherein a time period from the current time to the future time is adjustable to enable showing a longer or shorter time period measured from the current time to the future time.

* * * * *